(No Model.) 3 Sheets—Sheet 1.
G. B. DAVIDS.
GRINDING MILL.
No. 304,506. Patented Sept. 2, 1884.
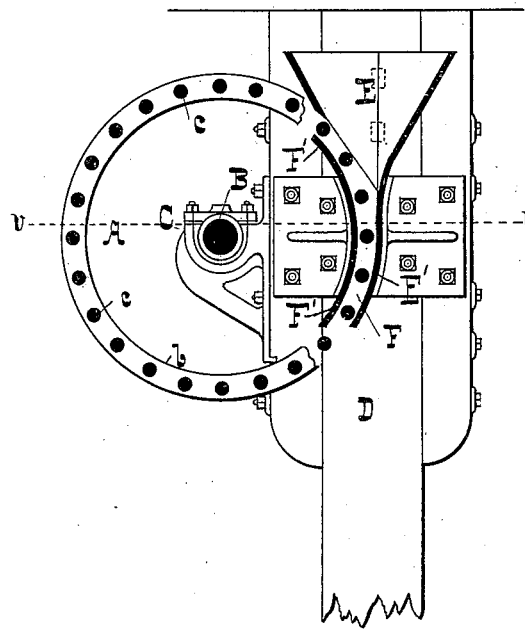
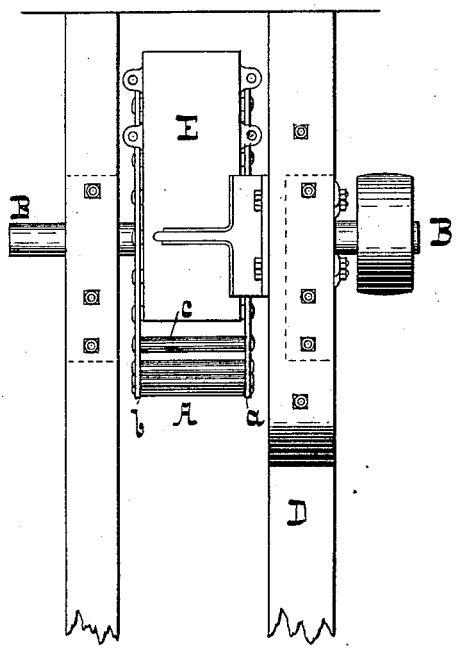
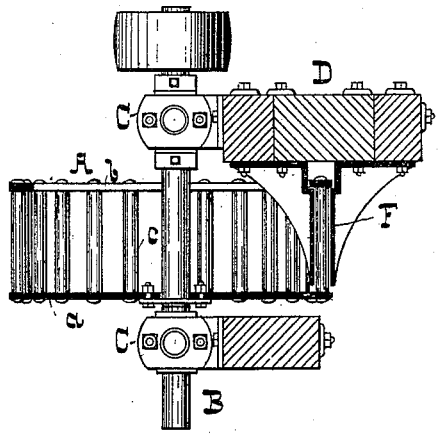
WITNESSES
Danl Fisher
Chas B Cassady
INVENTOR
Garret B. Davids.
by G.H. & W.J. Howard
Attys.

(No Model.) 3 Sheets—Sheet 2.
G. B. DAVIDS.
GRINDING MILL.
No. 304,506. Patented Sept. 2, 1884.
- FIG IV -
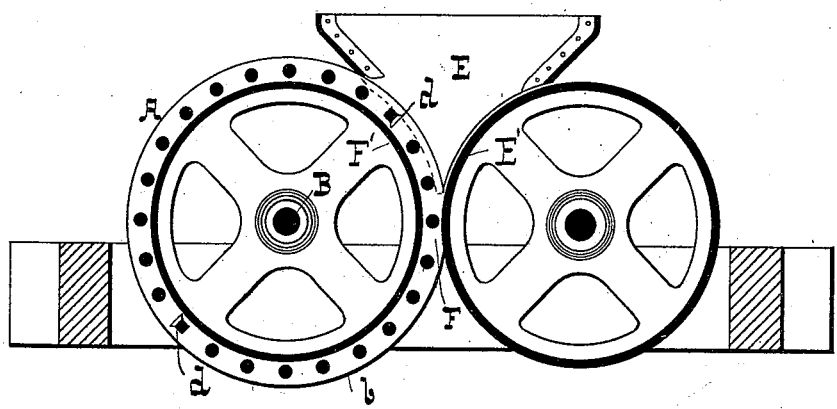
- FIG V -
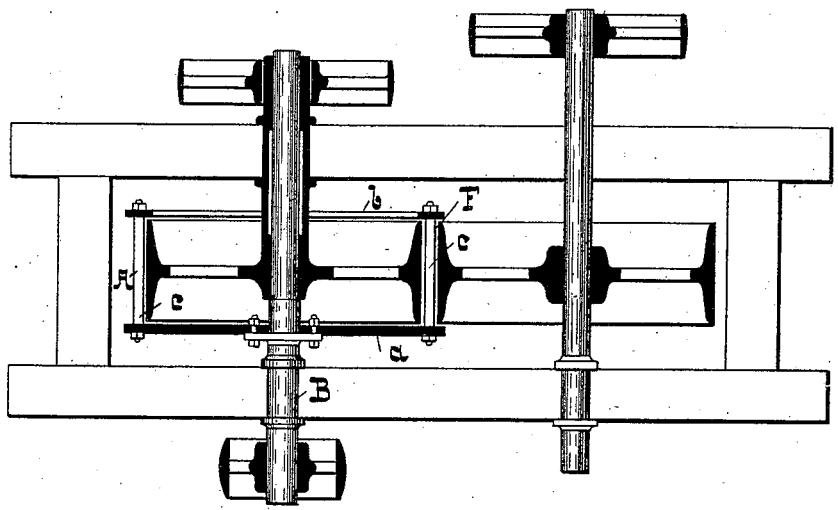
- WITNESSES -
Danl Fisher
Chas B. Cassady
- INVENTOR -
Garret B. Davids,
by G. H. W. Howard,
Atty.

(No Model.)  3 Sheets—Sheet 3.
G. B. DAVIDS.
GRINDING MILL.
No. 304,506.  Patented Sept. 2, 1884.
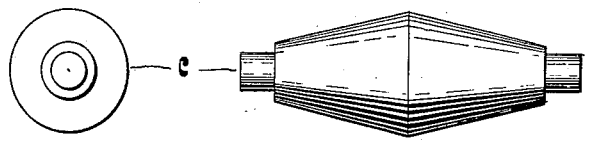
- FIG VI -
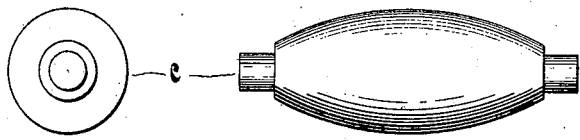
- FIG VII -
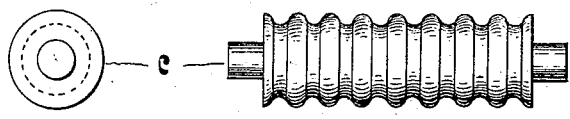
- FIG VIII -
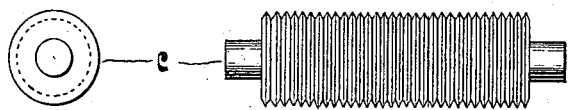
- FIG IX -
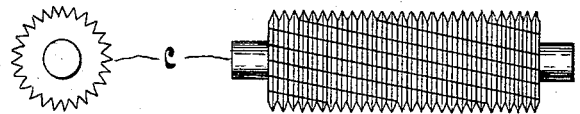
- FIG X -
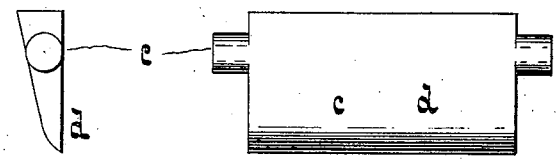
- FIG XI -
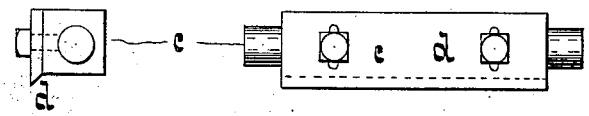
- FIG XII -
WITNESSES
Paul Fisher
Chas. B. Cassady
INVENTOR
Garret B. Davids
by G. H. & W. T. Howard,
Attys.

UNITED STATES PATENT OFFICE.

GARRET B. DAVIDS, OF BALTIMORE, MARYLAND.

GRINDING-MILL.

SPECIFICATION forming part of Letters Patent No. 304,506, dated September 2, 1884.

Application filed February 29, 1884. (No model.)

*To all whom it may concern:*

Be it known that I, GARRET B. DAVIDS, of the city of Baltimore and State of Maryland, have invented certain Improvements in Grinding-Mills, of which the following is a specification.

In the description of my invention which follows, Figure I is a sectional side elevation of the improved mill. Fig. II is a front view of the same. Fig. III is a sectional view taken through the dotted line $v\ v$, Fig. I. Figs. IV and V are respectively a longitudinal section and a sectional plan of the mill, illustrating a modified construction of the same. Figs. VI to XII, inclusive, are views of part of the mill, showing various constructions of the same.

Referring to Figs. I, II, and III, A is a revoluble cage, consisting of a disk, $a$, an annular rim, $b$, and the bars $c$, which last-named connect the rim and disk and form beaters. The disk $a$ of the cage A is bolted or otherwise fastened to the driving-shaft B, which is hung in bearings C, secured to upright posts D or to any stationary frame-work.

E is a hopper, into which the materials to be ground are placed, and F is a channel formed by the plates E′ and F′. The plate E′ is an extension of the hopper E, and is not attached or connected in any manner to the one, F′, except that it is bolted to the same frame-work. By having the plates E′ and F′ entirely separated, and beaters $a$ of the cage A supported at their ends only, the said beaters may pass entirely through the channel F and strike materials descending between the plates.

In Figs. IV and V the plates E′ and F′ are cylinders or rolls, and the channel F the space between them. The hopper in this case is not attached to either plate or roll, but serves to conduct materials to the channel F, as in the mill shown in Figs. I, II, and III. These cylindrical plates or rolls are not connected together in any manner, and are independent of the cage which revolves around one of them. The rolls may be revolved by mechanical means to assist in carrying materials from the hopper to the channel F; or they may be unprovided with means to turn them and allowed to acquire a revoluble movement independently of that of the beaters by the continued downward motion of the materials to be ground between them.

Referring again to Figs. IV and V, it will be seen that certain of the beaters are made wider than the others and sharpened. These enlarged beaters, which are denoted by $d$, scrape the surface of the rolls when the same are stationary or revolving at a less speed than the cage, and remove any material adhering thereto.

Figs. VI to XII, inclusive, illustrate different forms of beaters. In Figs. VI and VII a beater is shown as enlarged at the center, and of a circular cross-section. In Figs. VIII, IX, and X the beater consists of a grooved cylinder, and in the last-named figure the beater has longitudinal grooves. In Fig. XI the beater is of chisel form, and in Fig. XII a beater adapted as a scraper is shown.

While I prefer to have the sides of the channel through which the beaters pass smooth, they may be corrugated or roughened, if desired.

The beaters are made of hardened chrome-steel on a wrought-iron core, the ends of which extend through the hardened casing to admit of their being turned to fit the holes in the disk and rim.

The cage is arranged to revolve at a very high rate of speed, and when the materials from the hopper E are struck by the beaters they are reduced and forced from the channel.

I make no claim herein to any peculiar construction of the beaters shown, but reserve the right to fully describe and claim them in a future application for Letters Patent.

I claim as my invention—

In a grinding-mill, the combination of a hopper, a pair of disconnected plates separated to form a channel in communication with the said hopper, and a revoluble cage having peripheral beaters supported at their ends only, whereby they are adapted to pass between the said plates and longitudinally of a channel formed between them in the grinding operation, substantially as and for the purpose specified.

GARRET B. DAVIDS.

Witnesses:
WM. T. HOWARD,
CHAS. B. CASSADY.